(12) United States Patent
Daly

(10) Patent No.: US 6,912,286 B1
(45) Date of Patent: Jun. 28, 2005

(54) ACTIVE NOISE CANCELLATION SYSTEM WITH INTEGRATED HORN FUNCTION

(75) Inventor: Paul D. Daly, Troy, MI (US)

(73) Assignee: Siemens VDO Automotive Inc., Chatham (CA)

( * ) Notice: Subject to any disclaimer, the term of this patent is extended or adjusted under 35 U.S.C. 154(b) by 748 days.

(21) Appl. No.: 09/670,779

(22) Filed: Sep. 27, 2000

Related U.S. Application Data

(60) Provisional application No. 60/162,918, filed on Nov. 1, 1999, and provisional application No. 60/197,139, filed on Apr. 14, 2000.

(51) Int. Cl.[7] .............................................. H04B 29/00
(52) U.S. Cl. ..................................... 381/71.1; 381/71.4
(58) Field of Search ............................... 381/71.1, 71.4, 381/94.1, 86; 250/731, 735; 307/9.1; 340/425.6

(56) References Cited

U.S. PATENT DOCUMENTS

| 3,868,684 A | | 2/1975 | Nunn, Jr. | |
|---|---|---|---|---|
| 5,423,569 A | * | 6/1995 | Reighard et al. | ............ 280/731 |
| 5,469,510 A | * | 11/1995 | Blind et al. | .................... 381/55 |
| 5,473,702 A | * | 12/1995 | Yoshida et al. | ............. 381/94.7 |
| 5,789,827 A | * | 8/1998 | Rowley et al. | ............... 307/9.1 |
| 5,850,458 A | * | 12/1998 | Tomisawa et al. | .......... 381/71.4 |
| 5,929,751 A | * | 7/1999 | Chatwell | ................. 340/384.1 |

FOREIGN PATENT DOCUMENTS

| EP | 0486180 | 10/1991 |
|---|---|---|
| GB | 2252657 | 8/1992 |
| GB | 2254979 | 10/1992 |

OTHER PUBLICATIONS

International Search Report—Jan. 22, 2001.

* cited by examiner

Primary Examiner—Forester W. Isen
Assistant Examiner—Brian Pendleton

(57) ABSTRACT

An active noise cancellation system has a speaker which is utilized to generate sound to cancel engine noise, as is known. An operator horn switch communicates with a control for the active noise cancellation system. Upon receiving a request from the operator for a horn signal, the control for the active noise cancellation system generates a horn tone from the speaker associated with the active noise cancellation system. If cancellation is in progress, the cancellation is preferably paused during the period of time when the horn signal is being emitted.

13 Claims, 2 Drawing Sheets

ACTIVE NOISE CANCELLATION SYSTEM WITH INTEGRATED HORN FUNCTION

This application claims priority to U.S. Provisional Application No. 60/162,918 filed on Nov. 1, 1999 and U.S. Provisional Application No. 60/197,139 filed on Apr. 14, 2000.

BACKGROUND OF THE INVENTION

This invention combines the function of a vehicle active noise cancellation system with the horn.

Vehicles are typically provided with a separate horn which is selectively actuated by an operator to emit an audio signal. Typically, an audio component is incorporated into or near the steering wheel of the vehicle. An operator actuated switch causes this component to emit a sound.

Recently, modern vehicles have been provided with active noise cancellation systems. An active noise cancellation system attempts to cancel out the engine noise resulting in a quieter overall ride. Thus, the systems are typically provided with a speaker, and a sensor for sensing the vehicle noise. A control determines an appropriate tone to cancel the sensed noise. The speaker is driven to emit a noise to cancel the engine noise.

Active noise cancellation systems are already provided with a complicated computer system, and they do not necessarily perform all of the functions that they could provide.

It is the goal of the present invention to combine the function of the horn with the active noise cancellation system.

SUMMARY OF THE INVENTION

In a disclosed embodiment of this invention, a control for an active noise cancellation system also communicates with the horn switch. When the operator actuates the horn switch, the speaker associated with the active noise cancellation system is the audio component that actually emits the sound.

In preferred embodiments of this invention, a system for providing the horn tone through the active noise cancellation system determines whether the vehicle is operational, or whether noise cancellation is ongoing. A control determines if the vehicle is not being driven, or if active noise cancellation is not ongoing. If not, a hardware component, preferably the CODEC which is already incorporating into the computer for the active noise cancellation system, is utilized to generate the noise through the speaker.

If cancellation is in progress, then a pause routine is preferably actuated. The pause routine pauses the cancellation for a period of time, and actuates the horn through the speaker.

With the above disclosed invention, the function of both the horn and the active noise cancellation system are incorporated into one component. Thus, the cost of providing the two functions is significantly reduced, as is the operational complexity.

These and other features of the present invention can be best understood from the following specification and drawings, the following of which is a brief description.

DETAILED DESCRIPTION OF A PREFERRED EMBODIMENT

Figure 1:
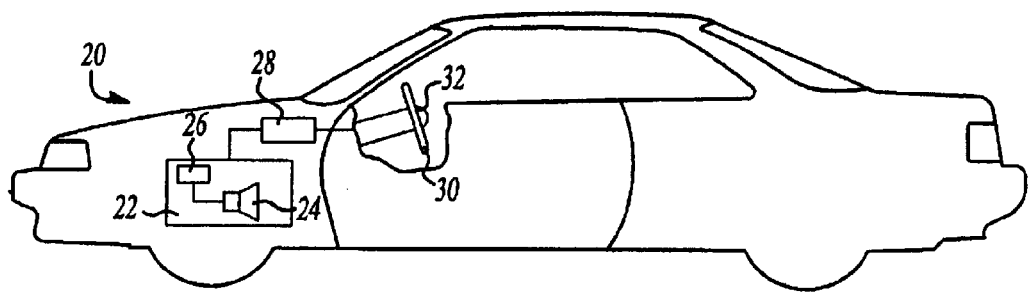
FIG. 1 is a schematic view of a vehicle incorporating the present invention.

A vehicle 20 is shown in FIG. 1 incorporating an engine 22 provided with an active noise cancellation system shown schematically by the speaker 24. The speaker 24 communicates with a control 26 which further communicates with a control 28 for the vehicle. A steering wheel 30 receives a horn switch 32 which further communicates with the computer 28 for the vehicle. Alternatively, switch 32 can communicate directly with control 26. As is known, the active noise cancellation system and its speaker 24 and control 26 are designed to generate a particular frequency and volume of noise selected to actively cancel engine noise. Such systems come in a variety of structures and utilize a variety of algorithms. The present invention can be directed to any such system, and serves to incorporate the horn function into the active noise cancellation system by utilizing a single speaker for both.

Figure 2:
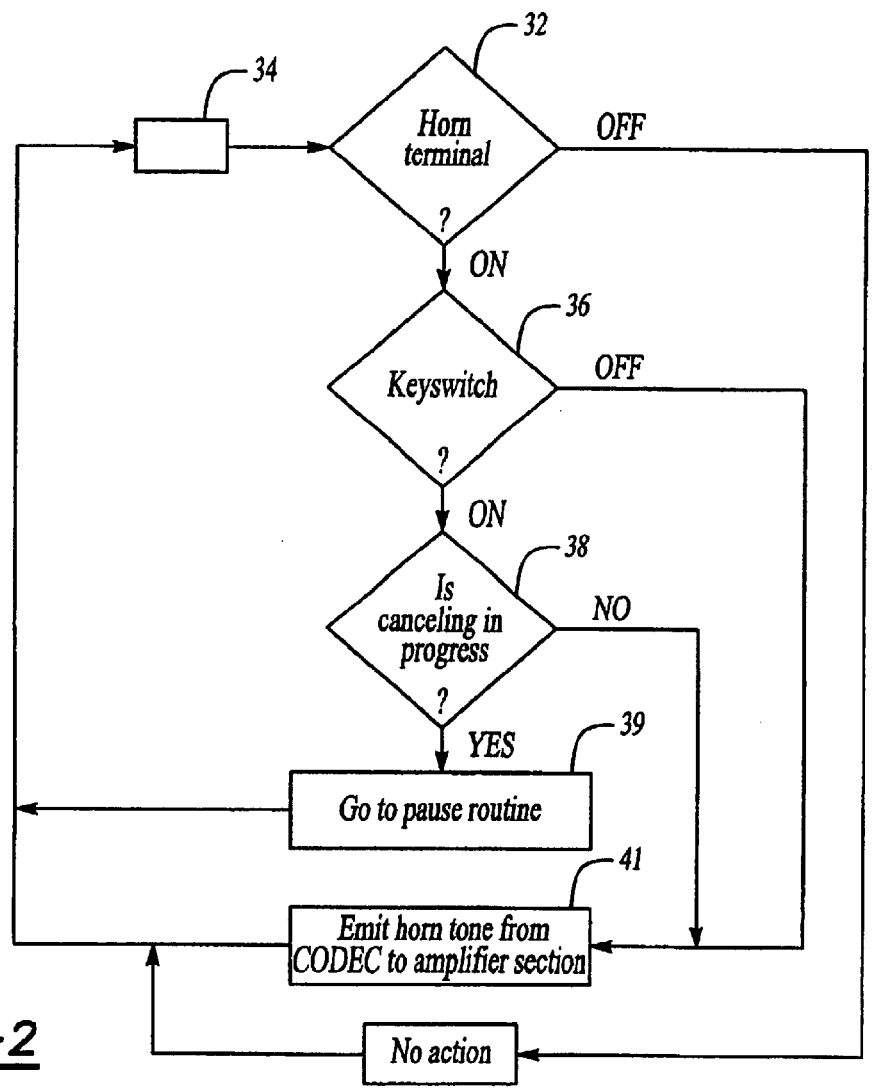
FIG. 2 is a hardware flowchart.

As shown in FIG. 2, in a hardware flowchart or logic, the first step is to determine whether the horn switch 32 has been actuated. If not, then no action is taken. If the horn switch has been actuated, then as can be best understood from FIG. 3, a loop is entered to determine whether the actuation was inadvertent. In the hardware logic of FIG. 2, the next step is to determine whether the ignition key 36 is on. If the key 36 is on, then the method proceeds to the next step of determining whether cancellation is in progress, such as shown at 38. If cancellation is in progress, then the next step is to enter a pause routine as shown at 39. The pause routine is best understood from FIG. 3. If the ignition switch is off, or if no cancellation is in progress, then the horn tone is emitted from a hardware portion of the computer 26 for the active noise cancellation system. In particular, the CODEC, which is typically a part of most modem computer based controls will be utilized to sound the horn.

As also shown, a hardware filter 34 is positioned adjacent the horn terminal switch to eliminate noise. The horn terminal portion of this circuit may be provided by an op-amp. Whether cancellation is in progress or not can be provided to the hardware 38 by a single pin high or low. That is, a single pin high or low fed to the op-amp of this portion of the system.

Figure 3:
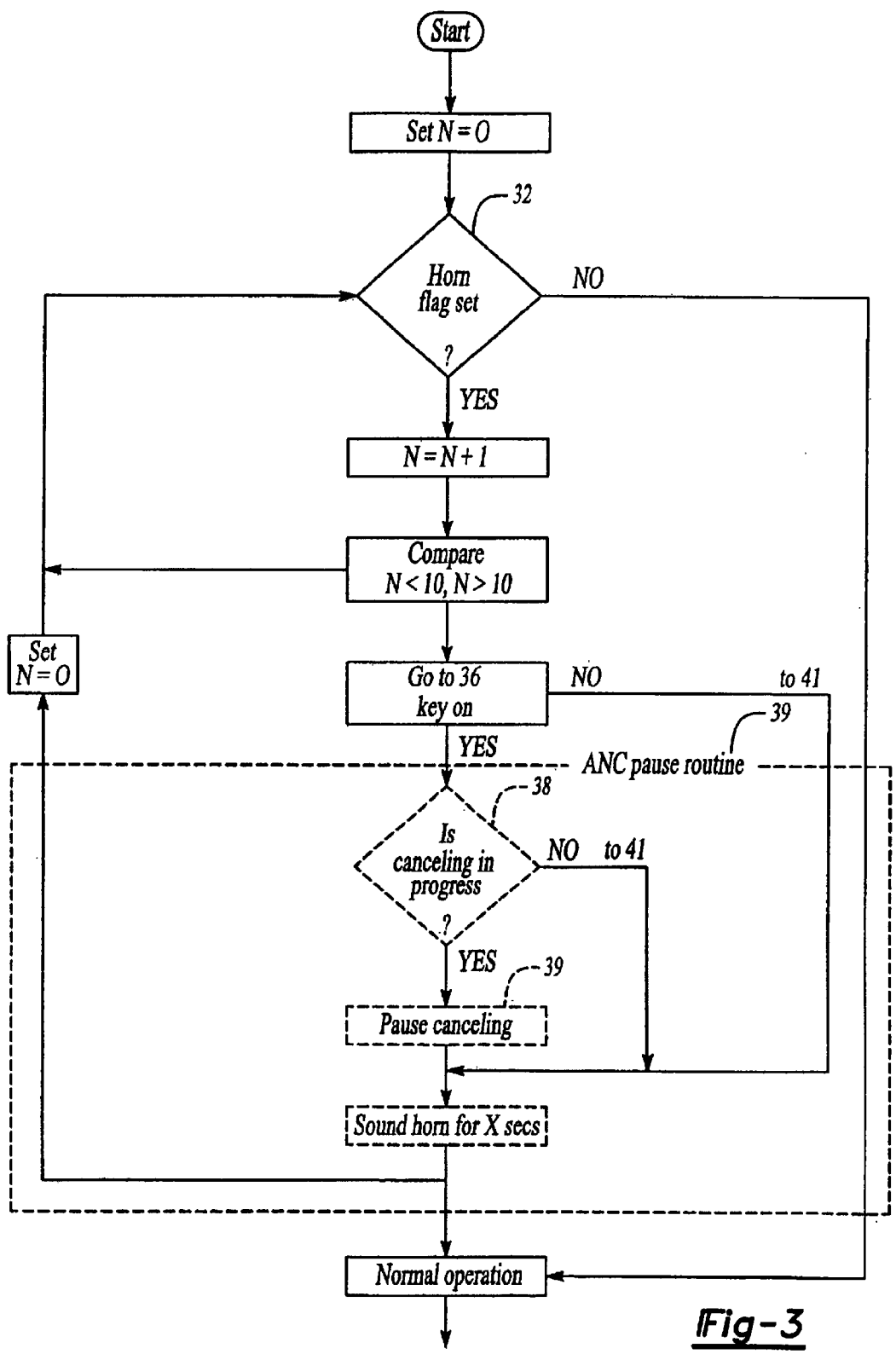
FIG. 3 is a software flowchart.

As shown in FIG. 3, to identify inadvertent activation, the system initially sets a variable to zero. If the horn signal is determined as being on, then a loop is entered to determine whether it is on for a significant period of time. Thus, by determining if the switch has been on for a period of time, as shown in the loop of 40, (here greater than 10 loops) then the system proceeds to its pause routine. A shorter activation is identified as inadvertent, and no further action is taken.

If cancellation is determined to not be in progress, then the horn is sounded as shown in FIG. 2 at 41. If canceling is in progress, then the software pauses the canceling for a period of time. At that time the horn is sounded for a period of time. Typically, the horn would be sounded for a period of between 1 and 5 seconds. Cancellation is then resumed.

A worker in this art would be able to design the necessary software, and the required hardware for this application is generally already available. It is functional interaction of the various components as described above which is inventive here.

The present invention thus discloses a method of combining the horn function with the active noise cancellation function. Although a preferred embodiment of this invention has been disclosed, a worker in this art would recognize that many modifications would come within the scope of this invention. For that reason, the following claims must be studied to determine the true scope and content of this invention.

What is claimed is:

1. A system associated with a vehicle comprising:
   an active noise cancellation system incorporating a control for determining an appropriate cancellation function, and for communicating with a speaker;
   a horn switch to be selectively actuated by an operator of the vehicle; and
   said horn switch communicating with said speaker such that when said horn switch is actuated by an operator, said active noise cancellation speaker is actuated to emit a horn sound.

2. A system as set forth in claim 1, wherein said control is provided with a pause routine to pause canceling should canceling be in progress when a request for a horn actuation is received.

3. A system as set forth in claim 2, wherein hardware within said control is utilized to actuate said speaker if canceling is not in progress when a horn actuation is requested.

4. A system as set forth in claim 1, wherein hardware within said control is utilized to cause said speaker to emit said horn sound if said actuation signal is received at n time when the vehicle key is not at an on position.

5. A system as set forth in claim 4, wherein said hardware is also utilized when said key is at an on position if cancellation is not in progress to cause said speaker to emit said horn sound.

6. A system as set forth in claim 5, wherein said hardware is a CODEC incorporated into a computer associated with said active noise cancellation system.

7. A system as set forth in claim 1, wherein said speaker is to be located remotely from a passenger cab of the vehicle.

8. A method of operating audio components on a vehicle comprising the steps of:
   1) providing an active noise cancellation system for generating a signal through a speaker to cancel engine noise, and providing an operator horn switch for selectively requesting a horn signal to be emitted by said speaker,
   2) receiving a signal from said horn switch requesting actuation of a horn signal; and
   3) utilizing said active noise cancellation speaker to emit a horn signal upon receiving said signal request of step 2.

9. A method as set forth in claim 8, wherein upon receipt of said request signal, said system determines whether cancellation is in progress, and enters a pause routine if cancellation is in progress when a horn request signal has been received.

10. A method as set forth in claim 8, wherein a step is taken to determine whether a vehicle ignition is in an on position when the signal of step 2 is received, and if said ignition is not in an on position, then a hardware component of a computer associated with said active noise cancellation system is utilized to generate a signal to said speaker to emit said horn sound.

11. A method as set forth in claim 8, further including the steps of positioning said speaker at a location outside a vehicle passenger compartments.

12. A system associated with a vehicle comprising:
   an active noise cancellation system incorporating a control for determining an appropriate cancellation function, and for communicating with a speaker;
   a horn switch to be selectively actuated by an operator of the vehicle; and
   said horn switch communicating with said speaker such that when said horn switch is actuated by an operator, said active noise cancellation speaker is actuated to emit a horn sound, said control determining initially whether an ignition key is on and whether cancellation is in progress upon receiving a request for a horn tone from said horn switch, said control utilizing a hardware component to generate a horn tone through said speaker if it is determined that said ignition key is no on, or if said noise cancellation is not in progress, and a pause routine being entered in said noise cancellation if said noise cancellation is on when a request for a horn tone is received.

13. A system as set forth in claim 12, wherein said speaker is to be located at a location outside of a vehicle passenger cab.

* * * * *